US008238346B2

(12) United States Patent
Howe et al.

(10) Patent No.: US 8,238,346 B2
(45) Date of Patent: Aug. 7, 2012

(54) QUEUING ARCHITECTURES FOR ORTHOGONAL REQUIREMENTS IN QUALITY OF SERVICE (QOS)

(75) Inventors: Wayne R. Howe, Irvine, CA (US); Muhammad Akber Qureshi, Irvine, CA (US)

(73) Assignee: The Boeing Company, Chicago, IL (US)

( * ) Notice: Subject to any disclaimer, the term of this patent is extended or adjusted under 35 U.S.C. 154(b) by 618 days.

(21) Appl. No.: 12/500,049

(22) Filed: Jul. 9, 2009

(65) Prior Publication Data

US 2011/0007687 A1 Jan. 13, 2011

(51) Int. Cl.
*H04L 12/28* (2006.01)
*H04L 12/54* (2006.01)
(52) U.S. Cl. ........... 370/395.42; 370/412; 370/413; 370/415; 370/417; 370/429
(58) Field of Classification Search ............ 370/395.42, 370/412, 413, 415, 417, 429
See application file for complete search history.

(56) References Cited

U.S. PATENT DOCUMENTS

| | | | |
|---|---|---|---|
| 6,680,906 B1 | 1/2004 | Nguyen | |
| 2003/0119556 A1* | 6/2003 | Khan et al. ................. | 455/560 |
| 2004/0199655 A1 | 10/2004 | Davies et al. | |
| 2005/0030952 A1* | 2/2005 | Elmasry et al. ............ | 370/395.2 |
| 2006/0268824 A1* | 11/2006 | Dhesikan et al. ............ | 370/351 |
| 2008/0165713 A1* | 7/2008 | Nishibayashi et al. ....... | 370/310 |
| 2010/0011118 A1* | 1/2010 | Chang et al. ................. | 709/235 |

FOREIGN PATENT DOCUMENTS

| | | |
|---|---|---|
| EP | 1083709 | 3/2001 |
| WO | WO/2007/058508 | 5/2007 |

OTHER PUBLICATIONS

Department of Defense Instruction No. 8100.3, Department of Defense Voice Networks, Jan. 16, 2004 (Note: This document describes MLPP); 47 pages.
IETF (Internet Engineering Task Force) RFC (Request for Comment) # 2475—An Architecture for Differentiated Services; Dec. 1998 (Note: This document describes DiffServ); 34 pages.
IETF (Internet Engineering Task Force) RFC (Request for Comment) # 2474—Definition of the Differentiated Services Field (DS Field) in the IPv4 and IPv6 Headers; Dec. 1998 (Note: This document describes DiffServ); 19 pages. IETF (Internet Engineering Task Force) RFC (Request for Comment) # 2998—A Framework for Integrated Services Operation over Diffserv Networks; Nov. 2000 (Note: This document describes DiffServ); 29 pages.
IETF (Internet Engineering Task Force) RFC (Request for Comment) # 3260—New Terminology and Clarifications for Diffserv; Apr. 2002 (Note: This document describes DiffServ); 10 pages.
IETF (Internet Engineering Task Force) RFC (Request for Comment) # 4594—Configuration Guidelines for Diffserv Service Classes; Aug. 2006 (Note: This document describes DiffServ); 54 pages.
UK Examination/Search Report dated Jan. 14, 2011 regarding Application No. GB1011632.5.

* cited by examiner

*Primary Examiner* — Brandon Renner
(74) *Attorney, Agent, or Firm* — Harness, Dickey & Pierce, P.L.C.

(57) ABSTRACT

A node in a mobile ad-hoc network or other network classifies packets (a) in accordance with a first set of priority levels based on urgency and (b) within each priority level of the first set, in accordance with a second set of priority levels based on importance. The node: (a) queues packets classified at highest priority levels of the first and/or second sets in high-priority output queues; (b) queues packets classified at medium priority levels of the first set in medium-priority output queue(s); and (3) queues packets classified at low priority levels of the first and/or second set in low-priority output queue(s). Using an output priority scheduler, the node serves the packets in order of the priorities of the output queues. In such manner, orthogonal aspects of DiffServ and MLPP can be resolved in a MANET or other network.

20 Claims, 13 Drawing Sheets

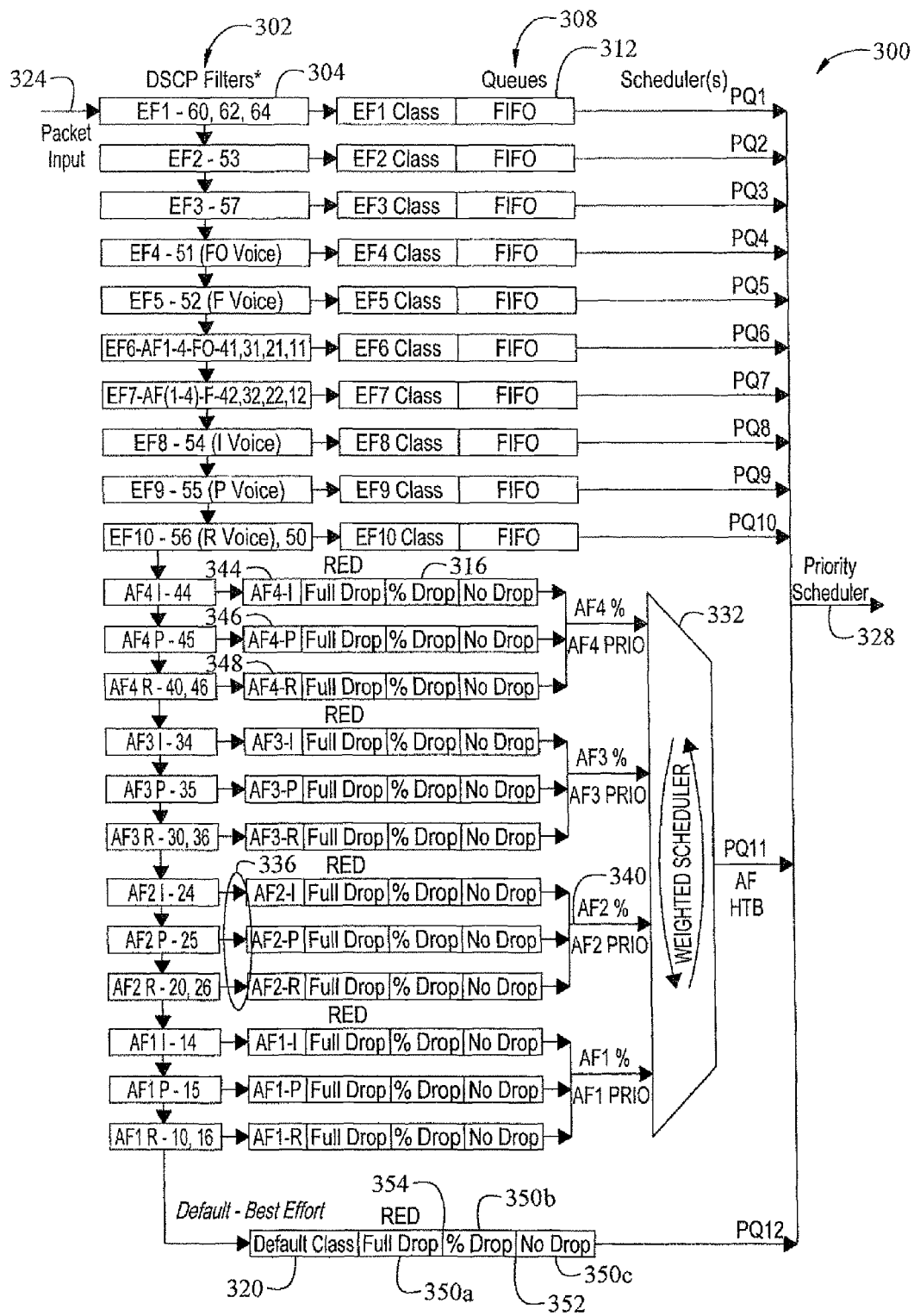
Fig. 4A  * All DSCP values are shown in base 8.

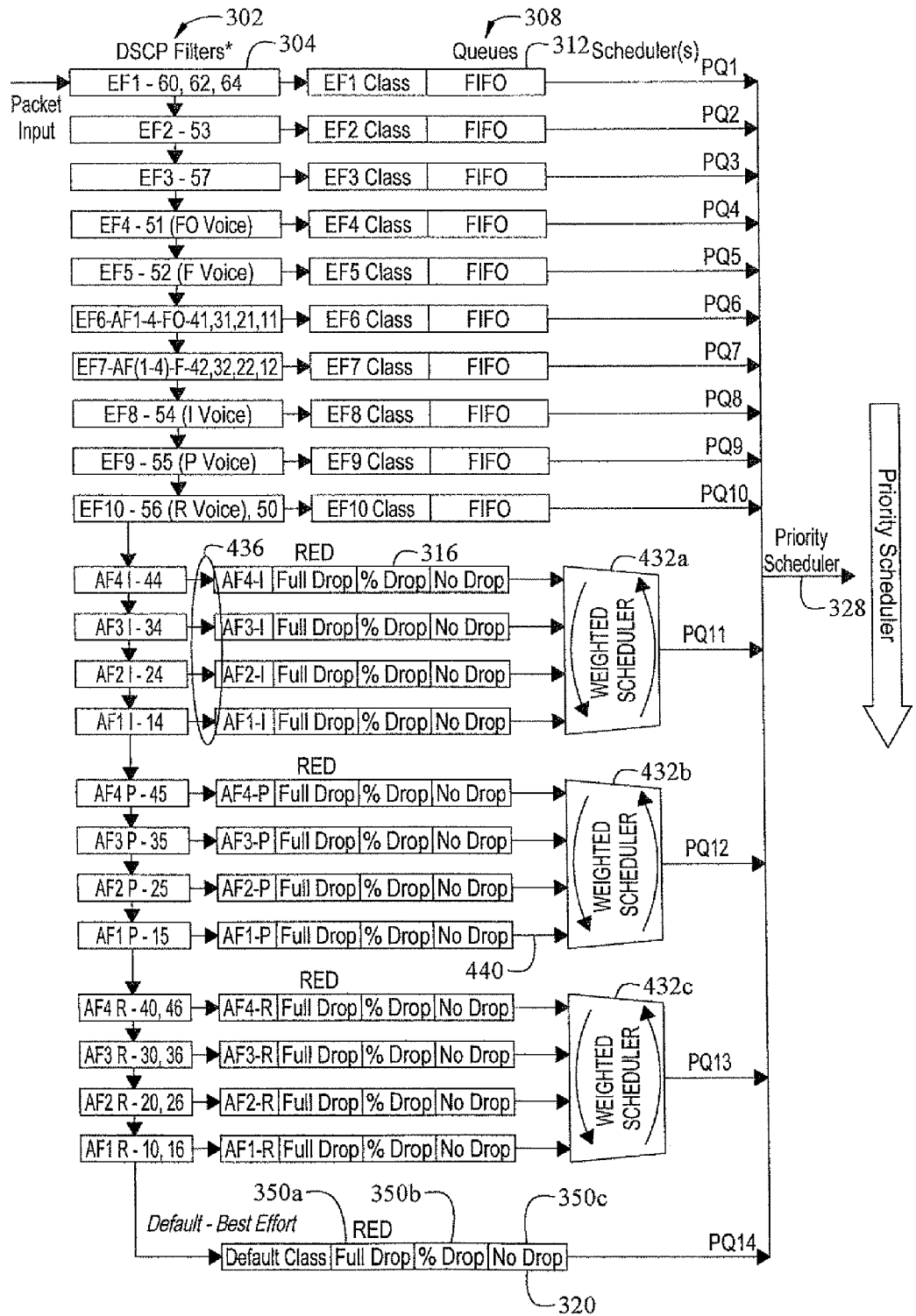
Fig. 4B  * All DSCP values are shown in base 8.

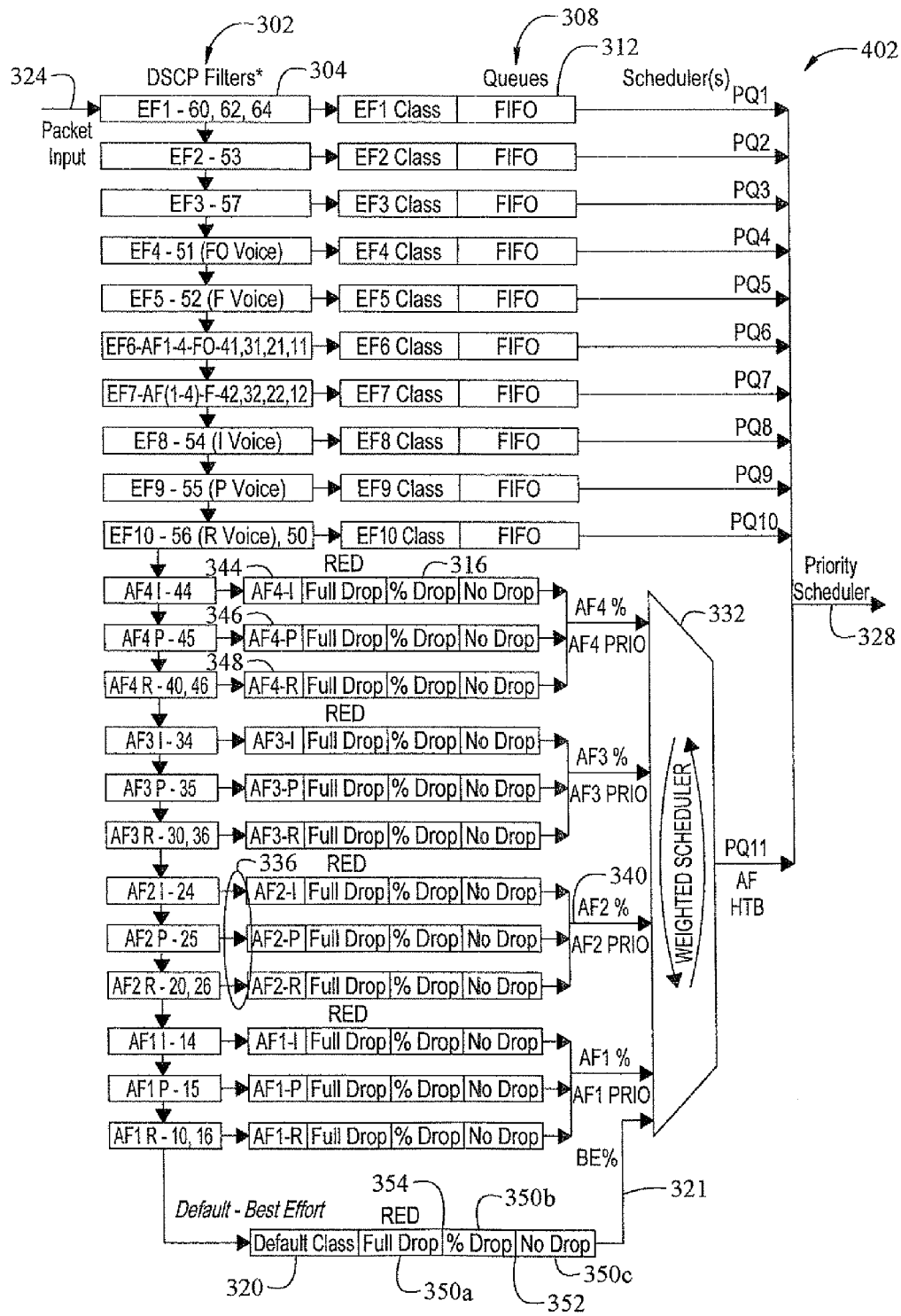
Fig. 4C    * All DSCP values are shown in base 8.

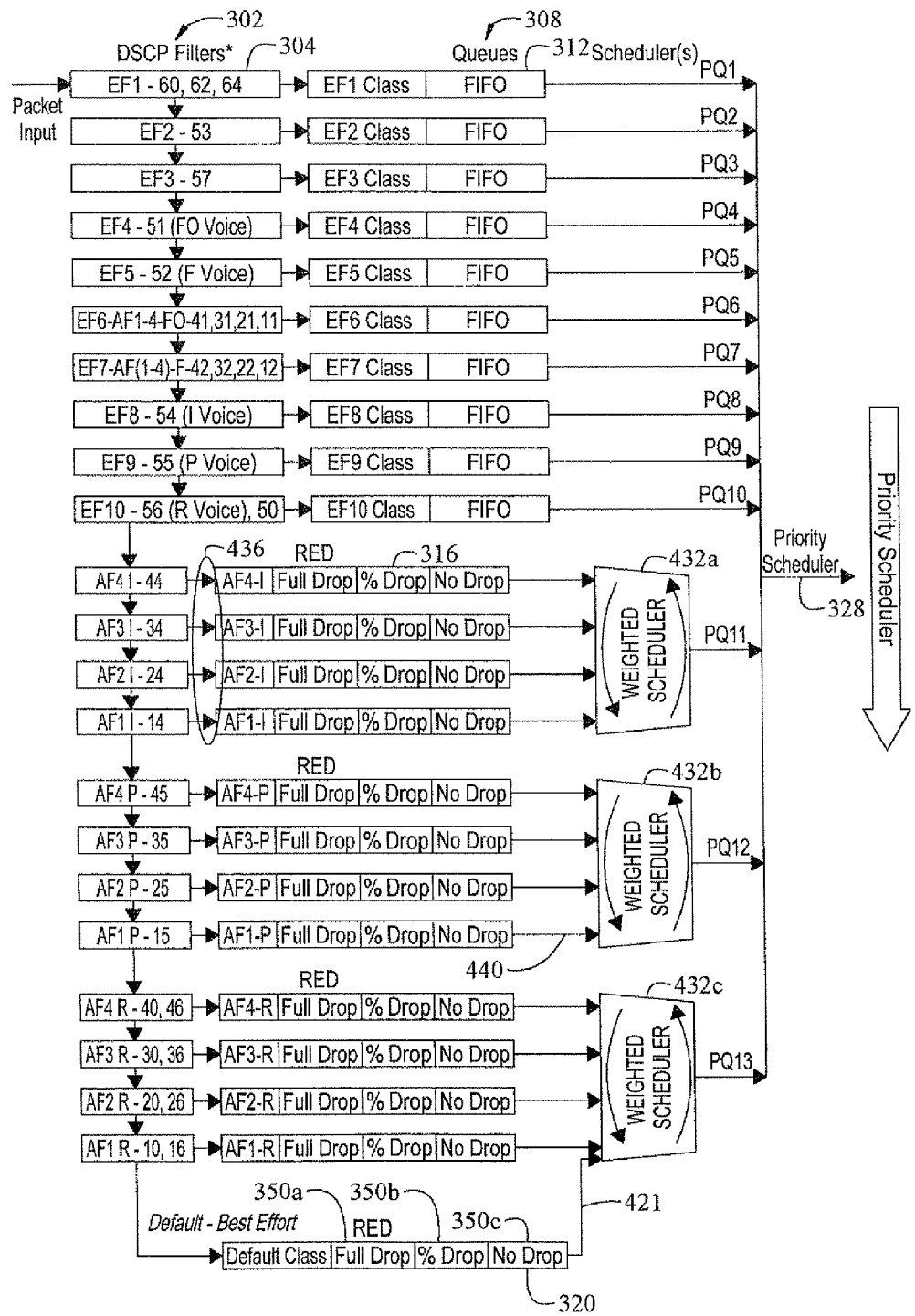
Fig. 4D     * All DSCP values are shown in base 8.

QUEUING ARCHITECTURES FOR ORTHOGONAL REQUIREMENTS IN QUALITY OF SERVICE (QOS)

GOVERNMENT INTEREST

This invention was made with Government support under W56 HZV-05-C-0724 awarded by the Army. The government has certain rights in this invention.

BACKGROUND

The statements in this section merely provide background information related to the present disclosure and may not constitute prior art.

In military and commercial mobile ad-hoc networks (MANETs), network nodes typically transmit and receive signals through air. In such circumstances network security may be a concern, bandwidth may be limited, and network traffic may be likely to congest. Providing Quality of Service (QoS) in such networks can be complicated by rapidly varying link quality bit error rate (BER), limited bandwidth, and topology changes in the MANET environment.

Two independent high-level prioritization methods have been specified for use in military MANETs to provide Quality of Service (QoS). One prioritization method is DiffServ (Differentiated Services), which evolved out of the IETF (Internet Engineering Task Force). DiffServ has typically been used in commercial applications on the Internet. In DiffServ a transmission is accorded a priority level based on the urgency of the transmission. The second prioritization method is MLPP (Multi-Layer Precedence and Preemption), which is used by the United States Department of Defense (DoD), MLPP was developed for use in military circuit-switched voice networks. In MLPP a transmission is accorded a priority level based on transmission importance.

These two approaches to prioritization, urgency versus importance, are independent, mutually exclusive, and thus orthogonal to each other. For example, a communication may be of high importance, but it may or may not be urgent, e.g., paying a bill by the end of the month may be important, but not urgent at the beginning of the month. On the other hand, a communication may be urgent or require timeliness or rapid response-time, but it may or may not be important, e.g., a non-important real-time voice conversation requires almost immediate delivery for a two-way conversation to take place. Current network implementations use either one type of prioritization or the other, but generally not both.

SUMMARY

In one implementation of the disclosure, a node is provided for use in a mobile ad-hoc network. The node includes a processor, memory, a plurality of output queues, and an output priority scheduler. The node is configured to classify a plurality of packets (a) in accordance with a first set of priority levels based on urgency and (b) within each priority level of the first set, in accordance with a second set of priority levels based on importance. The node queues packets classified at highest priority levels of the first and/or second sets in a plurality of high-priority output queues. The node queues packets classified at medium priority levels of the first set in one or more medium-priority output queues. The node queues packets classified at low priority levels of the first and/or second set in one or more low-priority output queues. Using the output priority scheduler, the node serves the packets in order of the priorities of the output queues.

In another implementation, the disclosure is directed to a mobile ad-hoc network comprising a plurality of nodes, each node having a processor, memory, a plurality of output queues, and an output priority scheduler. Each node is configured to classify and/or filter packets (a) in accordance with a first set of priority levels based on urgency and (b) within each priority level of the first set, in accordance with a second set of priority levels based on importance. Each node queues packets classified at highest priority levels of the first and/or second sets in a plurality of high-priority output queues each having a different high priority. Each node queues packets classified at medium priority levels of the first set in one or more medium-priority output queues. Each node queues packets classified at low priority levels of the first and/or second set in one or more low-priority output queues. Each node uses its output priority scheduler to serve the packets in order of the priorities of the output queues.

In yet another implementation, the disclosure is directed to a method of providing a traffic management mechanism in a computer network. One or more nodes of the network classify packets (a) in accordance with a first set of priority levels based on urgency and (b) within each priority level of the first set, in accordance with a second set of priority levels based on importance. A given node of the network queues packets classified at highest priority levels of the first and/or second sets in a plurality of high-priority output queues of the given node, each of the high-priority output queues having a different high priority. The given node queues packets classified at medium priority levels of the first set in one or more medium-priority output queues. The given node queues packets classified at low priority levels of the first and/or second set in one or more low-priority output queues, and, using an output priority scheduler, serves the packets in order of the priorities of the output queues.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way. It should be understood that throughout the drawings, corresponding reference numerals indicate like or corresponding parts and features.

FIG. 4A is a diagram of a queuing mechanism in accordance with one implementation of the disclosure;

FIG. 4B is a diagram of a queuing mechanism in accordance with one implementation of the disclosure;

FIG. 4C is a diagram of a queuing mechanism in accordance with one implementation of the disclosure;

FIG. 4D is a diagram of a queuing mechanism in accordance with one implementation of the disclosure;

DETAILED DESCRIPTION

Figure 1:
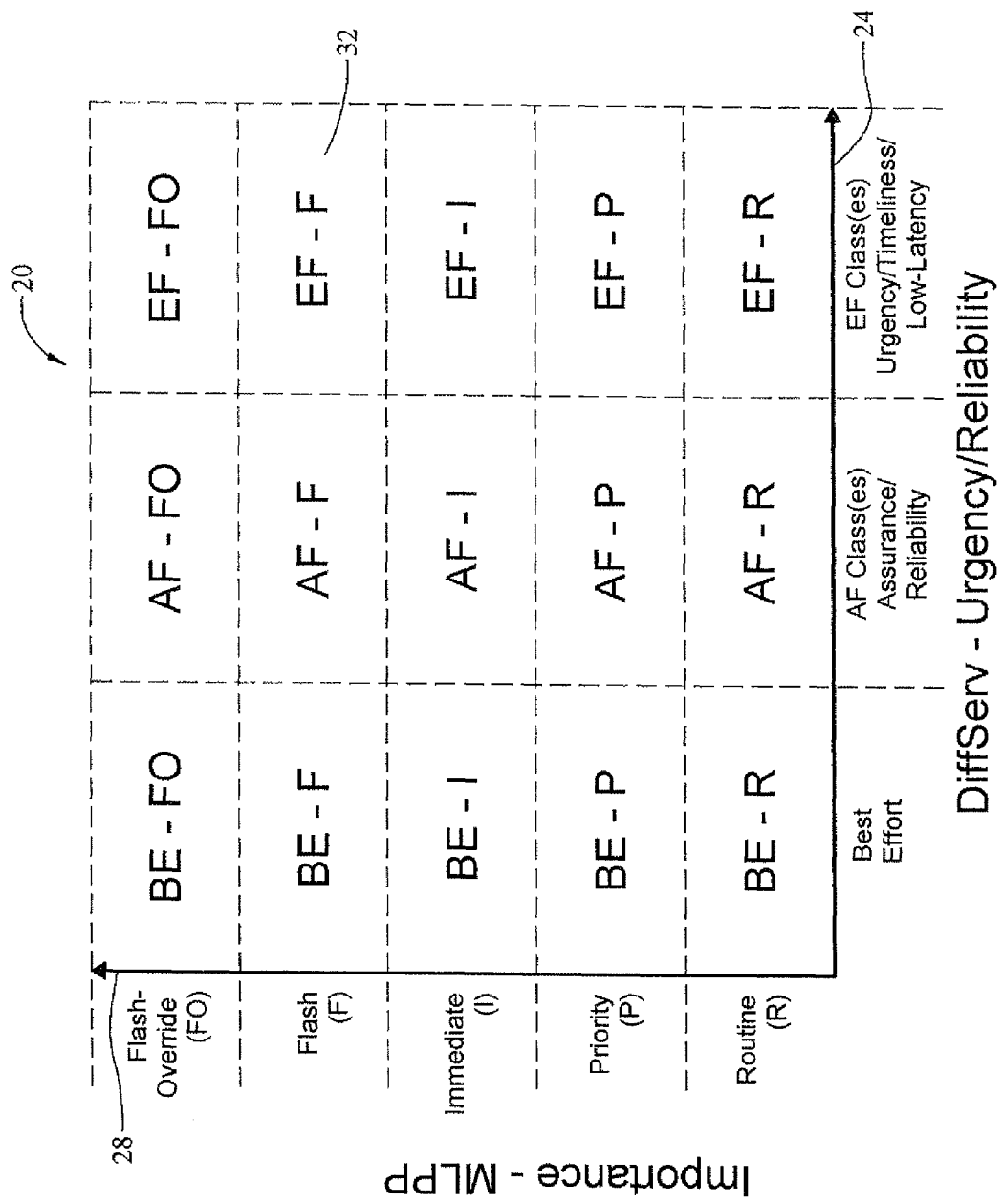
FIG. 1 is a matrix showing an orthogonal relationship between prioritization based on importance and prioritization based on urgency/timeliness/low latency and reliability.

The following description is merely exemplary in nature and is not intended to limit the present disclosure, application, or uses.

Among other aspects, the present disclosure teaches the implementation of prioritization by both urgency (e.g., DiffServ) and importance (e.g., MLPP). Further, although this approach may be used in connection with military MANETs, various implementations may be in relation to commercial MANET and/or non-MANET networks as well.

In various implementations of the disclosure, arrangements of queues, e.g., buffers (also described as queuing architectures or queuing disciplines) are provided in various locations and layers of packet switching systems and/or other computing and/or networking equipment and/or systems. Such arrangements may be used, e.g., to logically resolve Quality of Service (QoS) conflicts between a priority system based on importance and a priority system based on urgency. Conflicts may be resolved, for example, between the military strict-priority system of MLPP (Multi-Level Precedence and Preemption) and the commercial Internet prioritization system of Differentiated Services (DiffServ). MLPP and DiffServ represent different objectives and different (i.e., orthogonal) operational philosophies. In various implementations of the disclosure, these two orthogonal approaches are combined such that quality of service (QoS) may be provided effectively for a military or commercial MANET or other network in a low-bandwidth and/or high-congestion environment.

DiffServ (Differentiated Services)

A military MANET or commercial network typically supports at least three DiffServ per-hop behaviors (PHBs), e.g., as defined in IETF standards (RFC 3246, RFC 2597): "Expedited Forwarding" (EF), Assured Forwarding (AF), and Best Effort (BE). "Expedited Forwarding" (EF) packets at a node are to be served at or faster than the provisioned rate. Deviation of actual departure time from an ideal departure time of each packet is to be bounded. Traffic in the EF class can expect to experience low delay and low jitter at each hop, assuming that the lower layers also provide bounded delay for EF traffic. End-to-end delay is a product of the bounded per-hop delay and the number of hops, which can frequently change in the highly mobile environment of military or commercial MANET due to frequent route changes.

DiffServ Assured Forwarding (AF) PHB attempts to minimize long-term congestion within its traffic class, while allowing short term congestion resulting from bursts. Generally, a scheme such as Random Early Detection (RED) can provide such behavior, since it distributes losses in time and maintains normally low queue depth while absorbing spikes. Four AF subclasses may be defined, where each AF subclass is allocated, within each router, a particular amount of buffer space and link bandwidth. Further, three drop priorities may be defined within each AF subclass, e.g., to assign different drop probabilities to three classes of traffic in case of congestion. The level of forwarding assurance that a packet belonging to an AF subclass receives at a router depends, e.g., on a fraction of forwarding resources allocated to the class, a current load in that class, and a drop precedence of the packet.

Traffic in a DiffServ Best Effort (BE) class does not receive any throughput, delay or loss assurance. It should be noted that IETF DiffServ allows for more than one EF class within the EF PHB. Additionally, IETF DiffServ EF PHB allows for priority scheduling for EF (time-sensitive) traffic, but with rate limits so that an EF class can not completely starve lower-priority classes. Accordingly, even the lowest priority Diffserv "Best Effort" class does not completely starve (i.e., not get any service at all). This is in contrast to MLPP, which allows higher priority packets to starve lower priority packets.

DiffServ Code Points (DSCP)

DiffServ service differentiation is provided by the network layer of a MANET using six-bit traffic class markers in Internet Protocol (IP) packet headers, referred to as DiffServ Code Points (DSCP). Each router maintains a separate queue for each class (and subclass, as the case may be.) The queues are served (i.e., packets are scheduled for transmission) based on queuing policies configured in the router. In various implementations of the disclosure, the six DSCP bits are used to classify packets as to DiffServ priority and also as to MLPP priority. It should be noted generally that the use of any specific DSCP values to map to any specific MLPP, DiffServ or other classes described in this disclosure are exemplary. Substantially any values of DSCP could be used to map to any classes.

Since network QoS experienced by a MANET application is based on the DSCP assigned to its packets, assignment of DSCPs to application traffic occurs in a controlled manner taking into account the following factors: QoS requirements of applications (e.g., throughput, delay, and loss requirements); priority (i.e., class of service) of applications; and network bandwidth available for applications. Network bandwidth changes dynamically and is a function of several factors, including bandwidth allocation policies set up by a given network management system and current network conditions including traffic load, qualities of links, and network topology.

It should be noted that although QoS guarantees received by applications are defined in terms of DiffServ classes, the assignment of DSCP to an application takes into account specific requirements of the application, including but not necessarily limited to its priority. In such manner, resource contention can be handled among applications within a DiffServ class.

MLPP (Multi-Level Precedence and Preemption)

In a military MANET, QoS is to be based not only on DiffServ but also on MLPP (Multi-Level Precedence and Preemption). MLPP is a mechanism that strictly enforces a policy in which higher priority traffic takes precedence over and preempts (i.e., displaces) lower priority traffic, generally based on importance. In the MLPP context, precedence is a priority level associated with a call or session. Preemption is a process of terminating lower precedence calls that are currently using a target device or bandwidth, so that a call or session of higher precedence can be extended to (or through) the target device or medium. Thus, in a congestion situation where a lower priority session is established, later arriving higher priority traffic may preempt (displace) the lower priority traffic. According to MLPP policy, in a congested situation higher precedence traffic may totally starve lower precedence traffic, with no relative "fairness" or weighted sharing.

A military MANET network typically supports five levels of MLPP precedence, although infrequently, fewer or more levels may be defined. These standard five levels are as follows, in decreasing order of precedence.

Flash-Override (FO) is the highest MLPP precedence available in military MANET. FO is a capability available, e.g., to the President of the United States, the Secretary of Defense, and the Joint Chiefs of Staff. Flash Override generally cannot be preempted.

Flash (F) is the second highest MLPP precedence. Flash is reserved generally for telephone calls pertaining to (among other things) command and control of military forces essential to defense and retaliation, critical intelligence essential to national survival, conduct of diplomatic negotiations critical to the arresting or limiting of hostilities.

Immediate (I) is the third highest MLPP precedence. Immediate is reserved generally for telephone calls pertaining to (among other things) events of national or international significance, situations that gravely affect the security of national and allied forces, and intelligence essential to national security.

Priority (P) is the fourth highest MLPP precedence. Priority is reserved generally for telephone calls requiring expeditious action by called parties and/or furnishing essential information for the conduct of government operations.

Routine (R) is the lowest level of MLPP precedence. R is a precedence designation applied to those official government communications that require rapid transmission by telephonic means, but do not require preferential handling.

It should be noted that DSCPs assigned to applications may be adjusted dynamically based on current network conditions and/or policy changes. Thus, if network capacity diminishes due, e.g., to link quality changes or loss of network elements in platforms, QoS allocated by DSCP to some low priority traffic may be degraded to "Best Effort" class to accommodate some higher priority traffic. This is in accordance with MLPP.

DiffServ employs a philosophy of relative "fairness", which serves not only to prioritize traffic but also to ensure that lower-priority and/or "Best Effort" traffic does not totally starve (i.e., that even in highly congested situations "Best Effort" traffic will receive some small amount of service). DiffServ is also designed to attempt to give each class of service the specific type of handling that it needs. For example, traffic in need of low latency may receive EF PNB handling, while traffic that is important but not urgent (such as a database backup) may receive handling through one of the AF PHBs, which assures its delivery but not its promptness.

MLPP, on the other hand, is based on strict priority scheduling. In congested situations, MLPP strictly follows precedence rules and services the highest-priority traffic first, even if it means totally starving lower-priority traffic. MLPP operates to ensure that the most important traffic has complete precedence and preemptive power over all lower priority traffic. However, a strict application of MLPP priority scheduling can create a long priority list and can counteract the benefits of class-based services as implemented by DiffServ.

Both approaches have their merits, and it can be beneficial, e.g., to allow a higher precedence MLPP session to preempt a lower precedence MLPP session within the same DiffServ class of service. However, situations exist where strict MLPP precedence and preemption across different DiffServ classes may not be optimal. For example, a large database backup may be actively used in the "command and control of military forces essential to defense and retaliation"—which assigns this traffic a very high MLPP precedence of "Flash." However, a need for urgency or promptness (i.e., low latency) for this "Flash" database backup application may be very low.

Concurrently, a voice session may occur regarding a situation that "gravely affects the security of national and allied forces", which assigns this traffic a lower MLPP precedence of "Immediate."

In a congested situation which may occur frequently in military MANET or other networks, strictly applying solely MLPP would transfer the low-urgency but higher-precedence "Flash" database backup first, which may totally starve the urgently needed "Immediate" precedence low-latency voice call for the entire time it takes to back up the database (which could range, e.g., from minutes to hours). On the other hand, by solely using DiffServ in the same congested situation, the urgently needed "Immediate" precedence voice call would be serviced promptly in an EF (low-latency) PHB, while the "Flash" precedence database backup could be handled in an AF-4 class, where it is guaranteed to be delivered, but may be slightly delayed (which would be acceptable in this case).

MLPP in a military environment uses strict priority from "Flash Override" down to "Routine". Here, the highest precedence always pre-empts the lowest precedence, even if the high-priority packets are not time-critical. For example, if solely using MLPP, a large National Security database backup might get an MLPP of "Flash" (next to the highest priority), which could preempt all of the lower priority voice calls including "Immediate", "Priority", and "Routine", for the entire duration of the database backup, which could take several hours. It would be unacceptable to knock out most voice calls for occasionally lengthy periods, especially, e.g., for a warfighter system in a combat zone.

DiffServ, on the other hand, prioritizes the lowest latency (lowest delay) packets (such as voice) above the packets that do not require low latency. DiffServ has different classifications and uses different drop precedences, but generally conforms to the Internet principles of weighted sharing and "don't starve Best Effort," versus the MLPP approach of "preempt/starve lower priority info if necessary."

MLPP results in strict priority queuing, which may starve not only lower importance messages, but also lower-importance urgent (e.g., timely, real-time, low-latency) messages. MLPP has no way of determining the need for low latency, so it prioritizes strictly on importance. Strict importance-based precedence with a possibility of starvation is entirely valid in the classic military context.

MLPP was originally designed in the context of separate voice and data networks. Now, however, with the convergence of voice and data to the same network, some complications arise. Voice packets (typically 64 bytes) are much smaller than data packets (which are typically 1500 bytes). Even if a 64-byte voice packet and a 1500-byte data packet are the same MLPP classification, if the voice packet gets stuck behind the data packet, the voice packet must wait 23 times its own service time. Further, once the voice packet is behind the data packet, it has to wait the 23 times its own service time at each queuing structure for each hop. This wait time gets multiplied again by the number of 1500-byte data packets that the voice packet must wait behind. This can cause delays and jitter, even for extremely high priority voice packets. Accordingly, for voice and data packets convergent onto the same network, the inventors have observed that it is desirable to provide more refined queuing structures than to provide strict priority based on MLPP precedence classes.

DiffServ is designed to prioritize based on urgency (low latency) and reliability (assuredness). DiffServ has been designed to use priority queuing for EF classes, but with rate limitation so that lower classes do not starve. DiffServ AF classes may use a shared class-based weighting structure, in which borrowing may occur. DiffServ has a "Best Effort"

class for when the other classes are empty. DiffServ's class-based approach could be used in the military MANET context, except that DiffServ currently does not allow for prioritization by importance or MLPP.

As indicated by the foregoing discussion, there is an orthogonal relationship between prioritization based on importance (e.g., as defined in MLPP) and prioritization based on urgency/timeliness/low latency and reliability (e.g., as defined in DiffServ). This orthogonality is demonstrated conceptually by a matrix indicated generally in FIG. 1 by reference number 20. DiffServ priority levels are indicated along a horizontal axis 24. MLPP priority levels are indicated along a vertical axis 28. The respective priority levels may be combined, e.g., as indicated by matrix elements 32.

Figure 2:
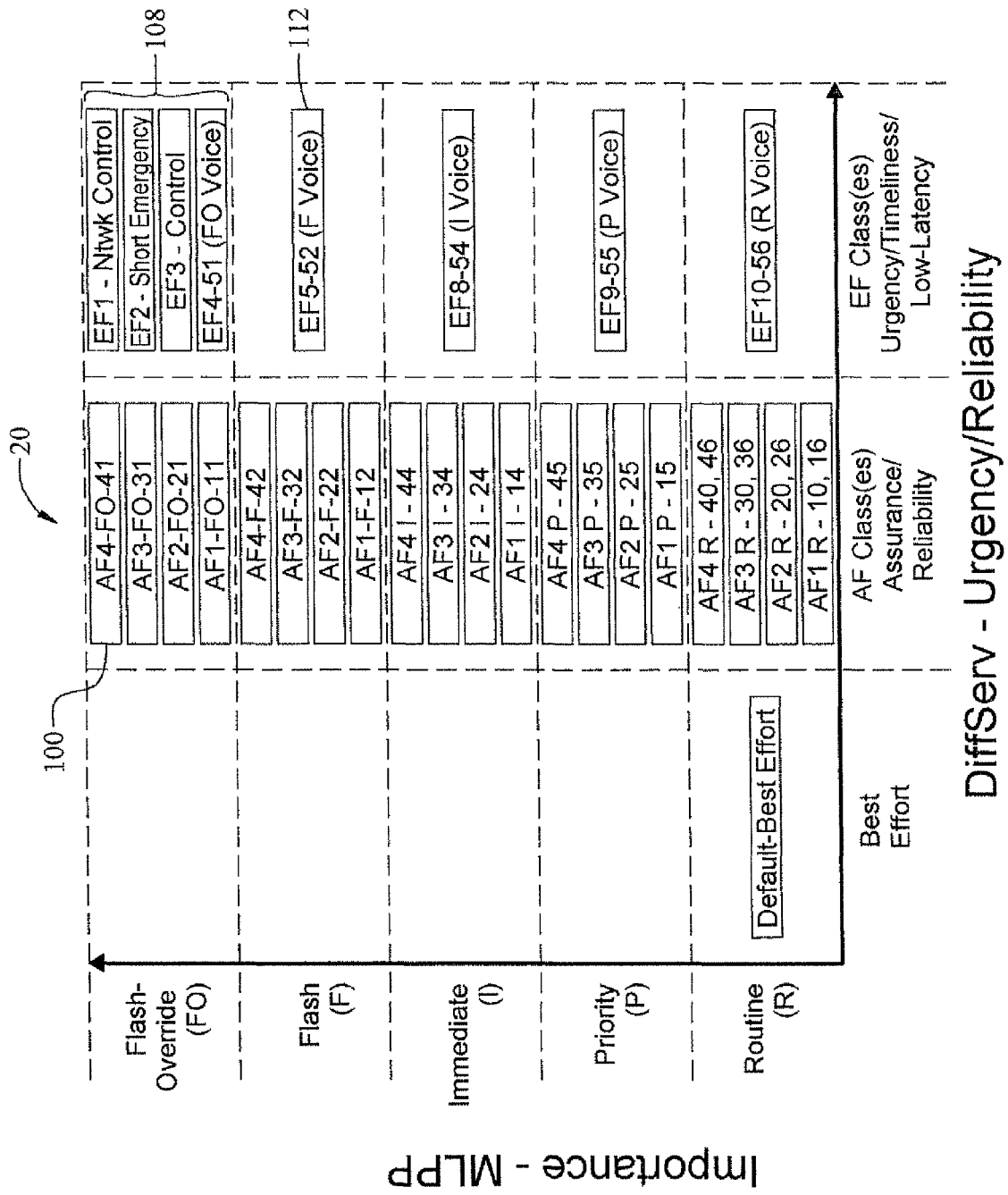
FIG. 2 is a packet classification scheme in accordance with one implementation of the disclosure.

The matrix 20 provides a general framework for classifying various network applications. Packets may be classified, for example, as shown in FIG. 2. A plurality of packet classes 100 are shown. Application packets each include a six-bit DSCP field that may be used to indicate both a DiffServ and a MLPP classification for a given packet. In the exemplary packet classification scheme shown in FIG. 2, MLPP categories are included within particular DiffServ classes, so that a total traffic flow in a military or commercial MANET or other network receives DiffServ classification, with MLPP precedence determining priority within each DiffServ classification. DSCPs are assigned to network applications to indicate the combined DiffServ/MLPP classifications. As shown in FIG. 2, both MLPP and DiffServ are used to categorize and prioritize packets. Highest-priority classes 108 include a class EF1, e.g., for network control; a class EF2, e.g., for short emergency messages or safety critical messages; a class EF3, e.g., for control packets; and a class EF4-51, e.g., for "Flash Override" voice. Another high-priority class 112 is a class EF5-52, e.g., for "Flash" voice.

In another implementation, packets may be classified in the following order:

1) highest priority for network packets,
2) special high-priority packets (e.g., short emergency or safety critical messages, or Call Setups),
3) highest-priority-lowest-latency packets (e.g., high-priority voice),
4) highest-priority-medium-latency (e.g., Flash or Flash-Override non-voice),
5) non-highest-priority-lowest-latency (e.g., low priority voice),
6) weighted sharing medium-priority-medium-latency packets (e.g., Assured Forwarding 1-4, Immediate, Priority, and optionally Routine), and
7) lowest-priority-highest-latency packets (e.g., Routine and/or Best Effort).

It should be noted that the foregoing classification schemes are exemplary only. Many different classification schemes could be used, dependent, e.g., on the particular needs and characteristics of a given network.

As further described below, various queuing architectures are provided for reconciling prioritization based on importance (e.g., by military MLPP), with prioritization based on urgency (e.g., by low delay/low latency DiffServ). Such architectures can be implemented, e.g., as device components using hardware queuing structures. Additionally or alternatively, software may be used in combination with, or in place of, hardware. For example, in one implementation a software script running on a processor of a software-defined radio is used to provide priority scheduling.

In various implementations of the disclosure, queuing architectures are provided that allow a balance to be established between DiffServ and MLPP in military MANETs and/or other networks. Because military MANET bandwidth is typically limited, in some congested cases non-important information is allowed to be starved in accordance with the principles of MLPP. Additionally, some forms of class-based QoS can be implemented in accordance with DiffServ so that even non-top-priority low-latency real-time applications and/or even Best Effort or Routine applications are supported and not starved in congested scenarios. Unlike high-bandwidth landline networks, in a military MANET environment of low and varying bandwidth, with a possible need to transmit extremely important life-or-death messages, it may be acceptable to starve lower priority traffic. Accordingly, in various implementations it is appropriate to provide a final output priority scheduler in a queuing mechanism for a military MANET or other network.

In addition, traffic classes for military MANETs are optimally flexible and granular in order to support both DiffServ and MLPP. Accordingly, a plurality of queues may be provided to support granularity in a military MANET QoS queuing mechanism as further described below. Alternatively, if it is inappropriate for a particular network to starve lower classes, such as Best Effort or Routine, these packets may optionally be included as inputs into a weighted scheduler.

Figure 3:
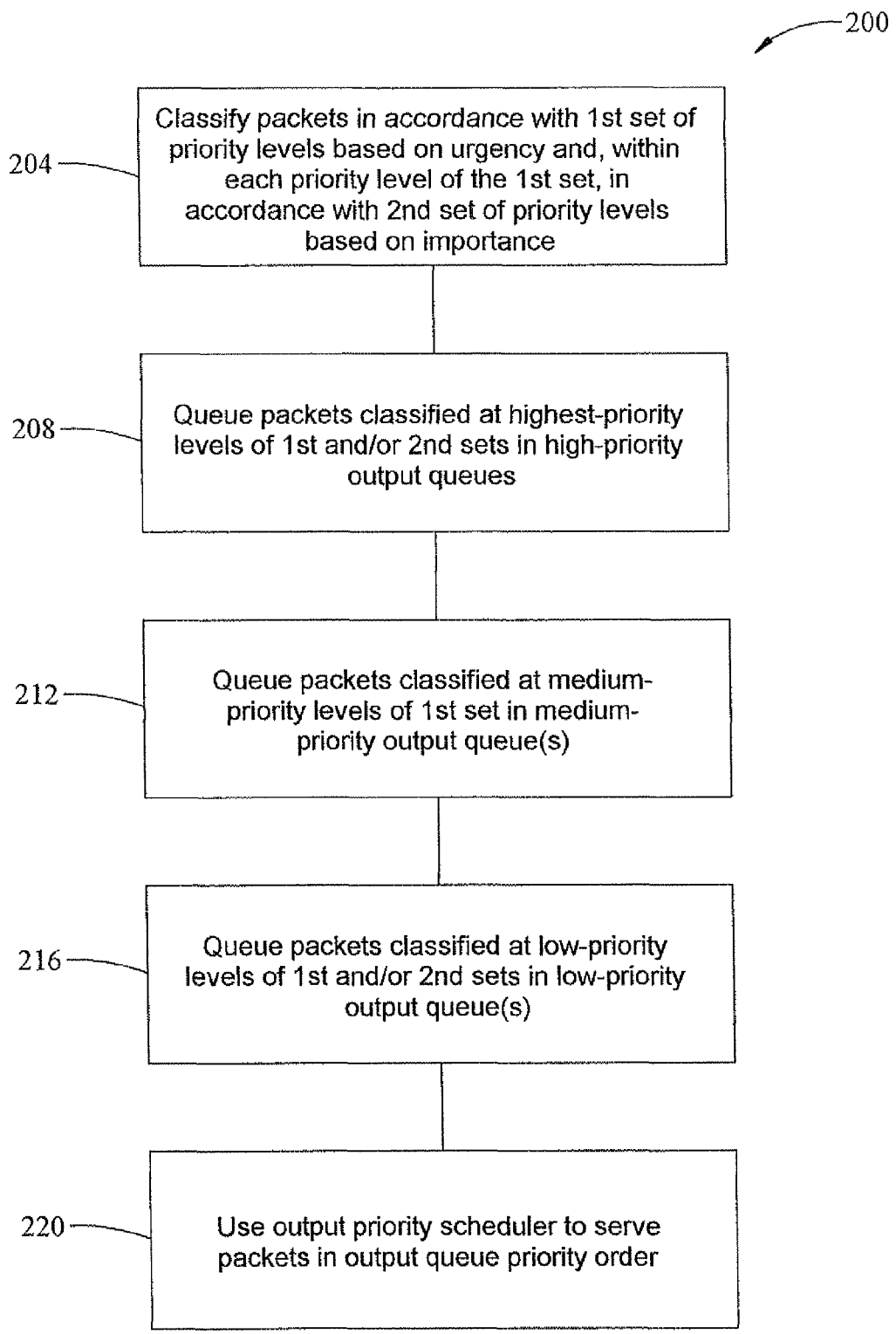
FIG. 3 is a flow diagram of a method of providing network traffic control in accordance with one implementation of the disclosure.

In some implementations, network traffic control may be provided, e.g., by network nodes in accordance with a method indicated generally in FIG. 3 by reference number 200. In process 204 application packets are classified, e.g., as previously described with reference to FIG. 2. Packets are classified by their urgency, that is, their need for "Expedited Forwarding" (DiffServ EF for timeliness/low latency), "Assured Forwarding" (DiffServ AF for reliability), or "Best Effort" (DiffServ BE). Additionally, within each urgency level, the application packets are classified in accordance with their importance, e.g., by MLPP categories "Flash Override" (FO), "Flash" (F), "Intermediate" (I), "Priority" (P), and "Routine" (R). Packets are classified as MLPP traffic for each precedence level to as great a degree as possible. Packets thus are classified to support different prioritization levels such as network control and signaling, various priorities of voice classes or video classes, and high-priority short emergency or safety-critical messages.

In process 208 the most important and most urgent classes of packets, e.g., packets classified at highest-priority MLPP and/or DiffServ levels, are queued in a plurality of high-priority output queues, e.g., of a router node having an output priority scheduler as further described below. In process 212, packets classified at medium-priority levels of urgency are queued in one or more medium-priority output queues of the router node. In process 216, packets classified at low-priority levels of urgency and/or importance are queued in one or more low-priority output queues. In process 220 the router node uses its output priority scheduler to serve the packets in order of the priorities of the output queues. It should be noted that any type of queue may be used for any or each of the queues, including but not limited to FIFO (First-in First-Out), RED (Random Early Detect), Token bucket filter, rate limiting, head-drop, tail-drop, etc. It is contemplated that many different packet classifications and/or queuing configurations may be implemented in accordance with the method shown in FIG. 3.

A queuing mechanism in accordance with one implementation is indicated generally in FIG. 4A by reference number 300. The mechanism 300 includes a chain 302 of DSCP filters 304 and twenty-three (23) queues 308, specifically, ten (10) high-priority FIFO queues 312 for EF classes, twelve (12) medium-priority queues 316 for AF classes, and one low-priority, default BE queue 320. Packet input 324 enters the DSCP filter chain 302 and is filtered in accordance with DSCP bits on each packet. A packet meeting the criterion of a given filter 304 is queued into a corresponding queue 308. Otherwise the packet passes through the filter chain 302 until accepted by a filter 304 or until the packet enters the default BE queue 320.

The queuing mechanism 300 is serviced by a single output priority scheduler 328 that schedules packets in priority order as determined by the order of outputs PQ1 through PQ12 of the queues 308. A weighted fair scheduler and/or hierarchical token bucket 332 is provided for the AF queues 316 (specifically, for AF4 classes, AF3 classes, AF2 classes and AF1 classes.) Each AF class includes three separate priority queues 336 and a third level 340 of scheduling for MLPP within each AF class. Thus for each AF class, an AF-I class 344 is served into the AF weighted scheduler 332 before its associated AF-P class 346, which is served before its associated AF-R class 348.

Each of the medium-priority queues 316 and the BE queue 320 may include random early detection (RED) for randomizing early dropping at specified queue thresholds before the queue becomes completely full. Specifically, each queue 316 and 320 may be divided into three sections 350a-c of different drop probabilities separated by a minimum threshold 352 and a maximum threshold 354 for a weighted moving average of fullness in the queue. When, e.g., a queue 316 or 320 is only slightly full, no packets are dropped. When the minimum threshold 532 in the queue is passed by the weighted moving average, packets are randomly dropped in accordance with a statistical probability. When the weighted moving average passes the maximum threshold 354, all packets are dropped.

In some implementations, random early detection may include performance of ECN (Explicit Congestion Notification). A parameter may be set on a packet that is not dropped but is sent to indicate to other hosts that honor ECN to return notification messages as to congestion in the network.

Each of the four priority queues 340 for the AF classes 316 is fed into the AF weighted scheduler 332 using a hierarchical token bucket (HTB) queuing discipline (qdisc) or some other implementation of weighted shared scheduling. In one embodiment, the four AF inputs into the AF weighted scheduler 332 have equal weightings of 25% each. Other non-equal weightings, however, may be chosen. The weighted scheduler 332 is serviced in priority order by the output priority scheduler 328. Lastly, the output priority scheduler 328 services the BE queue 320. In the present embodiment, the first three (3) bits of the 6-bit DSCP may be assigned to the DiffServ Class, and the second three (3) bits of the 6-bit DSCP may be assigned to the MLPP Class. However, in practice, DSCPs may be flexibly mapped to queues 308, such that any assignment of specific DSCP bit values may be made to correspond to particular combinations of MLPP and DiffServ classes. It should be noted that any type of queue may be used for any or each of the queues, including but not limited to FIFO, RED, token bucket filter, rate limiting, head-drop, tail-drop, etc.

As shown in an implementation indicated generally by reference number 402 in FIG. 4C, as one alternative to a policy of potential starvation for the lowest priority Best Effort class, the output of the Best Effort Queue 320 may be fed as an input 321 into the weighted scheduler 332.

A queuing mechanism in accordance with another implementation is indicated generally in FIG. 4B by reference number 400. The mechanism 400 includes a chain 302 of DSCP filters 304 and twenty-three (23) queues 308, specifically, ten (10) high-priority FIFO queues 312 for EF classes, twelve (12) medium-priority queues 316 for AF classes, and one low-priority, default BE queue 320.

The queuing mechanism 400 is serviced by a single output priority scheduler 328 that schedules packets in priority order as determined by the order of outputs PQ1 through PQ14 of the queues 308. Three weighted fair schedulers 432a-c are provided for the AF queues 316 (specifically, for AF-I classes, AF-P classes, and AF-R classes.) Each MLPP category (I, P and R) is handled by four separate priority queues 436 (one each for AF1, AF2, AF3 and AF4 respectively) that are fed into the corresponding weighted fair scheduler 432a, 432b or 432c. Each of the medium-priority queues 316 and the BE queue 320 may include random early detection (RED) for randomizing early dropping at specified queue thresholds before the queue becomes completely full.

As shown in an implementation indicated generally by reference number 404 in FIG. 4D, as one alternative to a policy of potential starvation for the lowest priority Best Effort class, the output of the Best Effort Queue 320 may be fed as an input 421 into one of the weighted schedulers 432a, 432b, or 432c. As shown in FIG. 4D, the input 421 is to the weighted scheduler 432c.

Figure 5A:
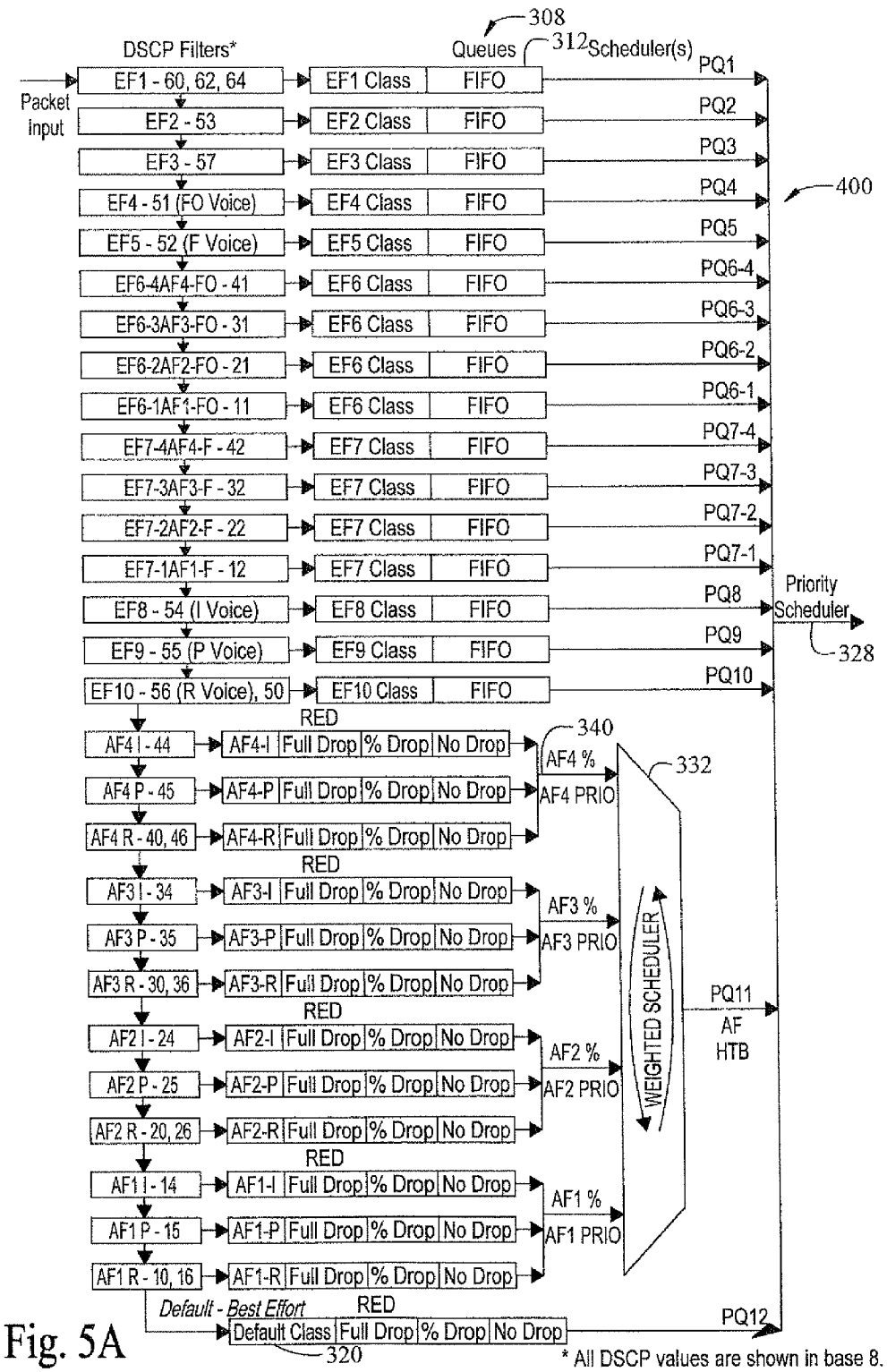
FIG. 5A is a diagram of a queuing mechanism in accordance with one implementation of the disclosure.

One implementation of a high-granularity queuing mechanism for a MANET or other network is indicated generally in FIG. 5A by reference number 400. The mechanism 400 includes a strict priority output scheduler 328, at least 16 priority FIFO EF queues 312 and a weighted fair queue (WFQ) scheduler 332 for Assured Forwarding classes (AF1-AF4; I, P, and R). A BE queue 320 is also included. The embedded WFQ 332 is fed by priority schedulers 340 incorporating a priority scheduling of the MLPP I, P, and R classes for each AF class. DSCPs are flexibly mapped to queues 308. Any type of queue may be used for any or each of the queues, including but not limited to FIFO, RED, Token bucket filter, rate limiting, head-drop, tail-drop, etc.

Figure 5B:
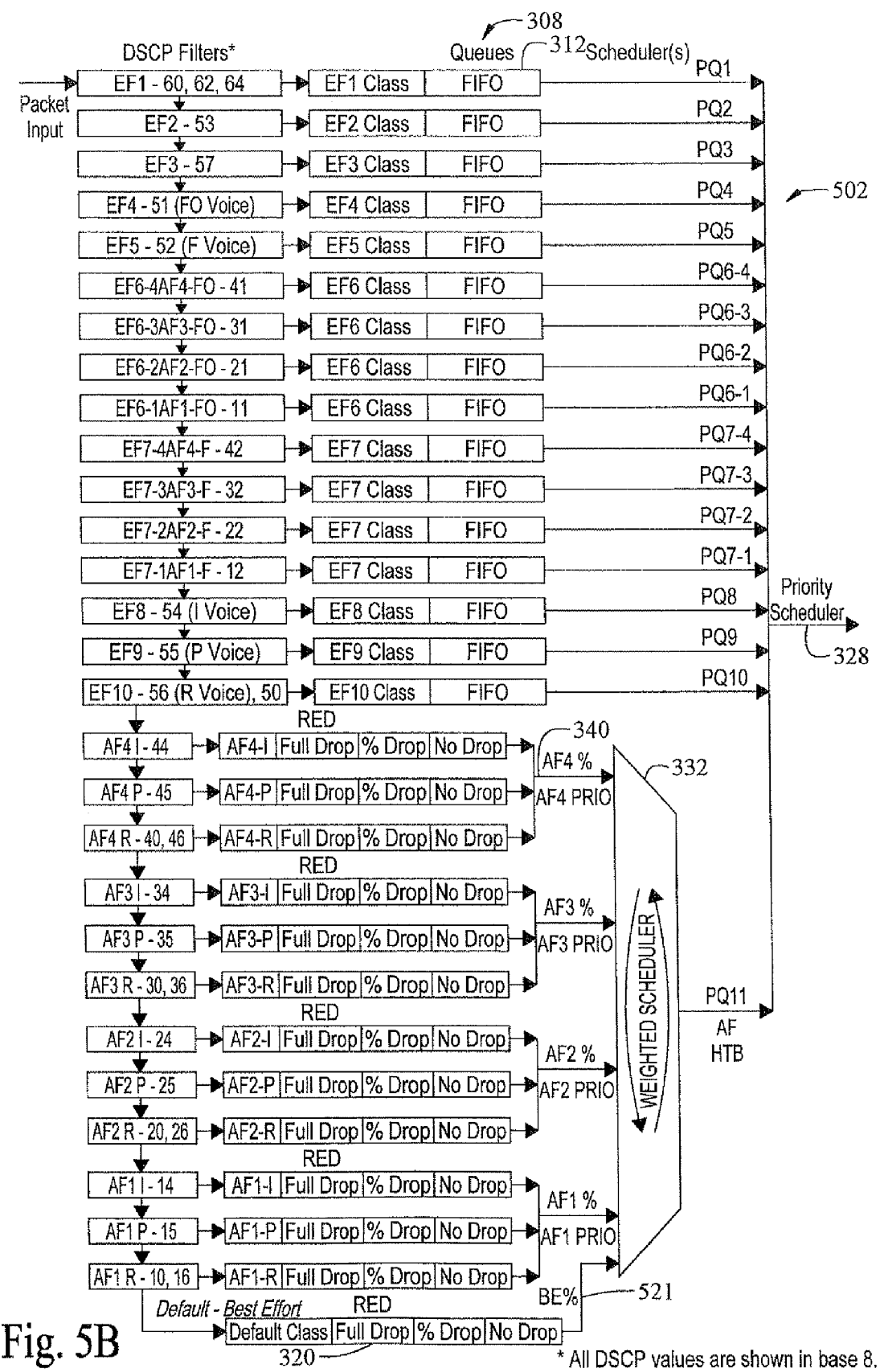
FIG. 5B is a diagram of a queuing mechanism in accordance with one implementation of the disclosure.

As shown in an implementation indicated generally by reference number 502 in FIG. 5B, as one alternative to a policy of potential starvation for the lowest priority Best Effort class, the output of the Best Effort Queue 320 may alternatively be fed as an input 521 into the weighted scheduler 332.

Figure 6A:
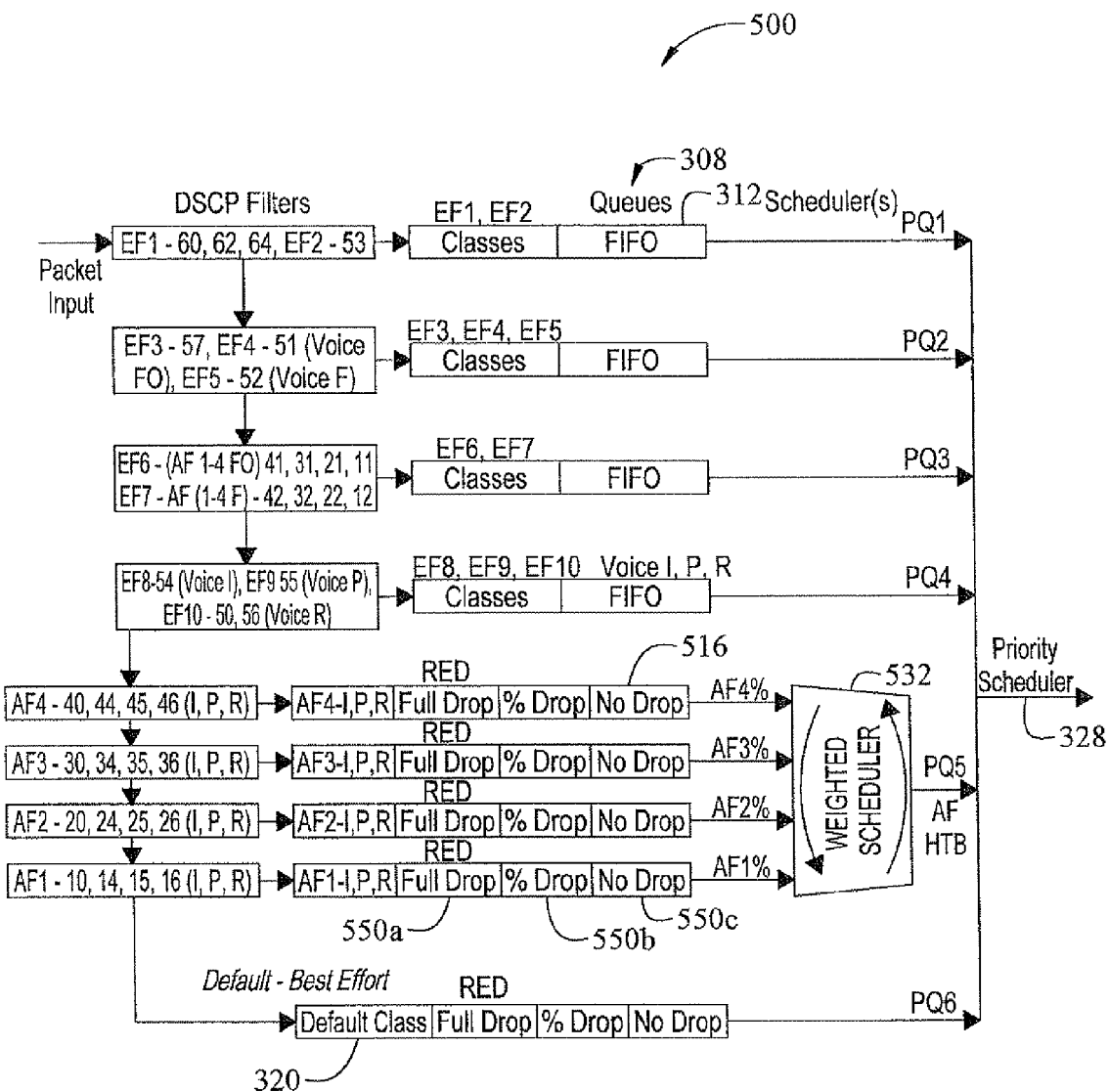
FIG. 6A is a diagram of a queuing mechanism in accordance with one implementation of the disclosure.

Another implementation of a queuing mechanism for a military MANET or other network is indicated generally in FIG. 6A by reference number 500. The mechanism 500 includes a strict priority output scheduler 328 with at least two (2) high-priority EF queues 312. Although a minimum of two (2) EF queues 312 may be used, illustratively four (4) high-priority EF queues 312 are shown in FIG. 6A. The queues 312 are followed by a weighted fair queue (WFQ) scheduler 532 to support at least two (2) "Assured Forwarding" classes 516. Although an unlimited number of AF queues 516 may be implemented, a minimum of two (2) AF queues is required, and this is shown illustratively with four (4) AF queues 516, AF1-AF4, in FIG. 6A. These queues are then followed by a "Best Effort" queue 320. The EF classes, here ten (10) EF classes (specifically, EF1-EF10) are merged into the at least two (2) high-priority FIFP queues 312, here shown illustratively as four (4) high-priority FIFO queues 312. The WFQ 532 is fed by at least two (2) AF queues, here shown illustratively as four (4) AF1-AF4 AF class queues 516. Each queue 516 may have RED (random early detect) with a higher drop probability 550a for R (Routine) packets, a lesser drop probability 550b for P (Priority) packets, and a low drop probability 550c for I (Immediate) packets. DSCPs may be flexibly mapped to queues 308, queues 516, and queue 320. Any type of queue may be used for any or each of the queues, including but not limited to FIFO, RED, token bucket filter, rate limiting, head-drop, tail-drop, etc.

Figure 6B:
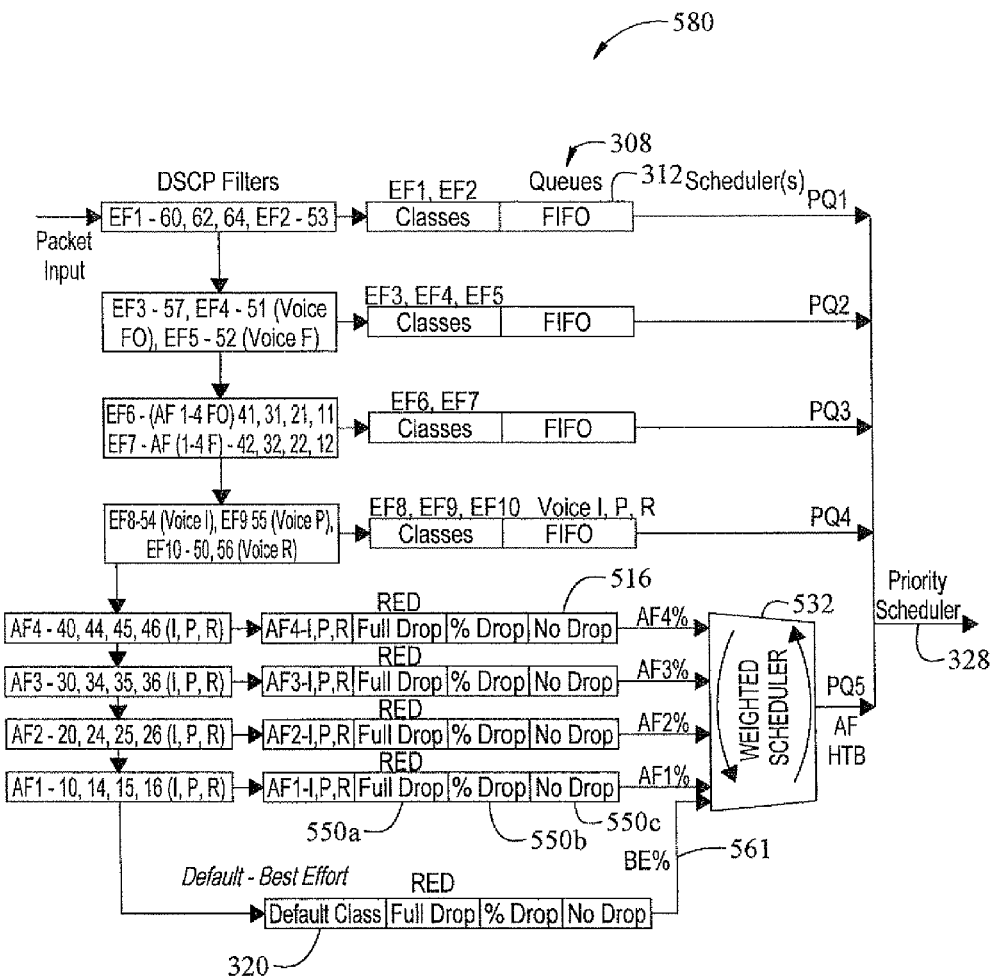
FIG. 6B is a diagram of a queuing mechanism in accordance with one implementation of the disclosure.

As shown in an implementation indicated generally by reference number 580 in FIG. 6B, as one alternative to a policy of potential starvation for the lowest priority Best Effort class, the output of the Best Effort Queue 320 may alternatively be fed as an input 561 into the weighted scheduler 532.

Figure 7:
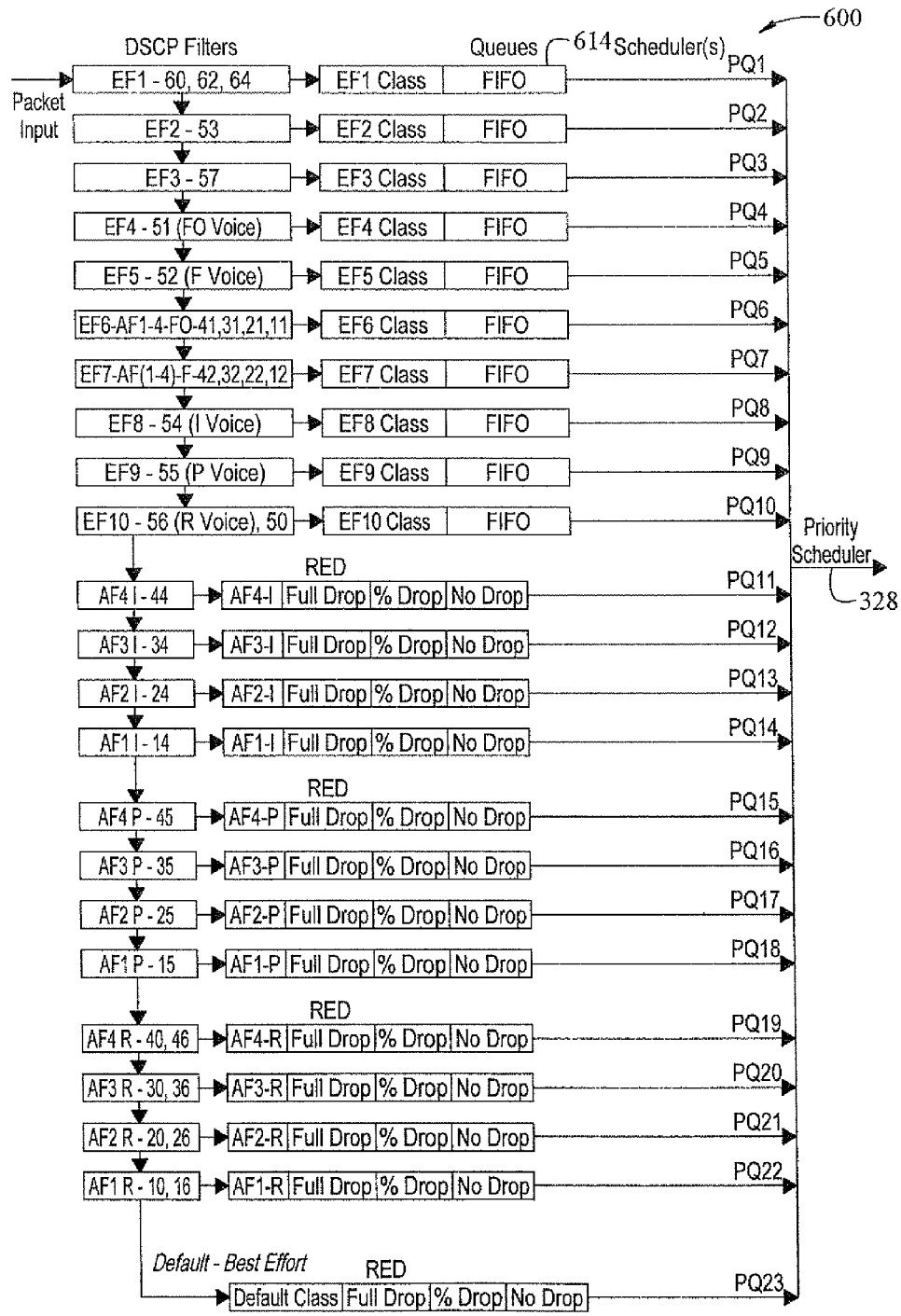
FIG. 7 is a diagram of a queuing mechanism in accordance with one implementation of the disclosure.

Another implementation of a queuing mechanism is indicated generally in FIG. 7 by reference number 600. The queuing mechanism 600 includes a single output priority scheduler 328. The scheduler 328 starts at a high priority queue 614 and services all packets from the first queue 614 before any lower queues are serviced. Only when all the higher priority packets are serviced does the scheduler 328 service the next lower priority queue. There is no weighting or sharing in the queuing mechanism 600.

Figure 8:
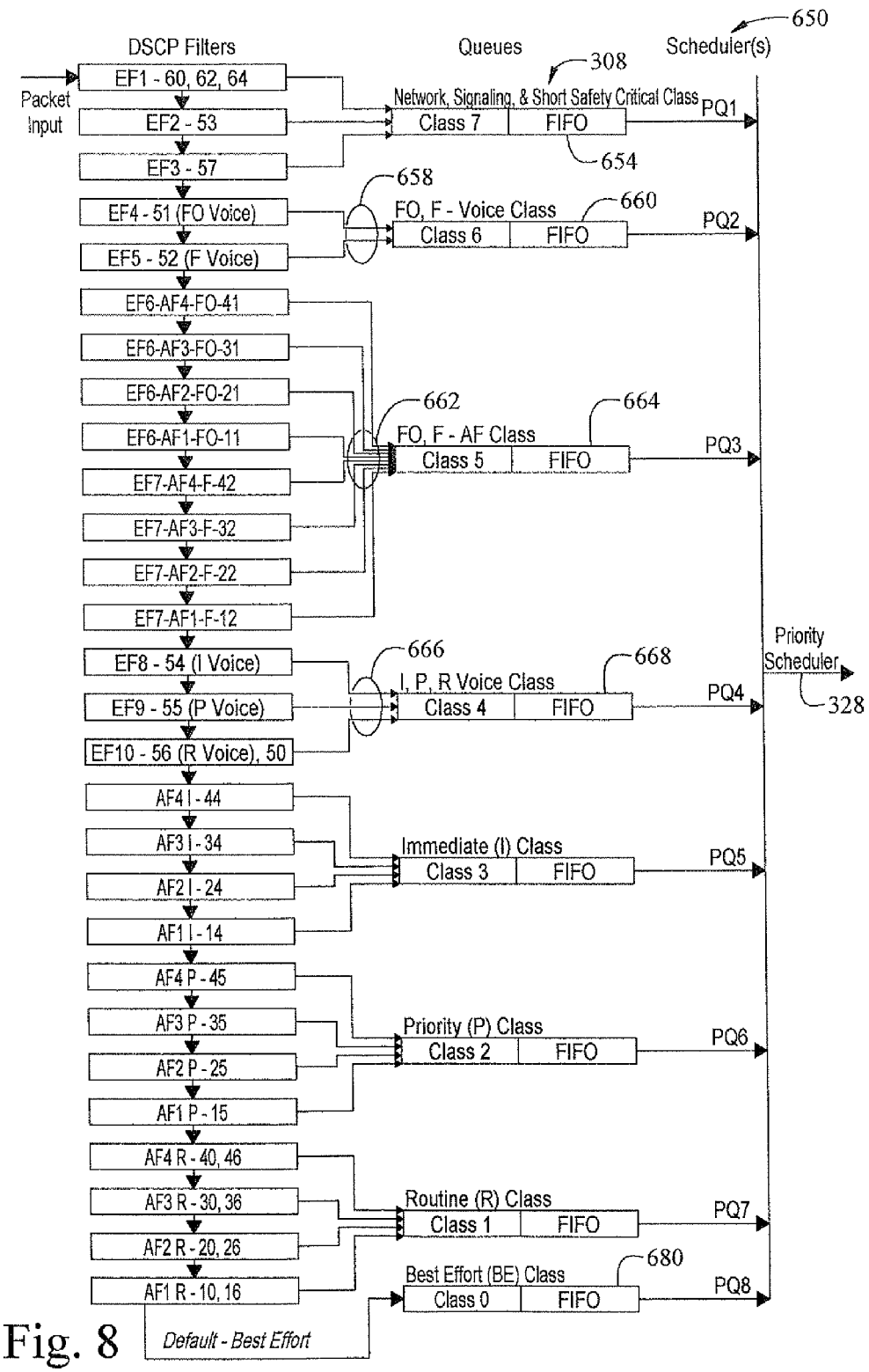
FIG. 8 is a diagram of a queuing mechanism in accordance with one implementation of the disclosure.

Another implementation of a queuing mechanism for a MANET or other network or system is indicated generally in FIG. 8 by reference number 650. The mechanism 650 includes a strict priority scheduler 328 and illustratively at least eight (8) separate queues 308, although fewer queues could be used by further combining more DSCP classifications into fewer queues. Illustratively, the top three EF classes (e.g., EF1, EF2 and EF3) are prioritized into a class 7 FIFO queue 654. Illustratively, FO and F voice traffic 658 is funneled to a class 6 queue 660. Illustratively, all AF-FO and AF-F traffic 662 is fed to a class 5 queue 664. Illustratively, lower-priority voice classes 666 (e.g., EF8, EF9 and EF10) are fed into a class 4 queue 668. Additionally, classes may be prioritized into the MLPP precedence classes of I, P, and R for class 3, 2, and 1 queues respectively. "Best Effort" packets may be fed into a lowest class 0 queue 680. An optimal prioritization of packets is possible in the mechanism 650. It should be noted that in other or additional implementations, specific groupings of traffic into queues may be arranged in different ways.

In various implementations of the disclosure a Linux tc script is used to provide a queuing mechanism. Queuing mechanisms could be implemented, however, on substantially any operating system, e.g., as part of the networking/communications stack.

The foregoing architectures and methods combine MLPP and DiffServ logically and elegantly while maintaining the benefits, advantages, and best aspects of both systems. The benefits of low-latency voice will only rarely be impacted by high volumes of traffic, while the benefits of the military MLPP importance precedence system are kept virtually intact. Other approaches have not provided ways that are as efficient or as effective to solve the conflict between DiffServ and MLPP, especiallly as specified by military MANETs in congested battlefield scenarios, but also in other, e.g., commercial, networks as well. The present disclosure may be implemented in hardware and/or software, but where implemented in software, the foregoing mechanisms and methods can be very inexpensive and can provide excellent QoS performance compared to other approaches. Implementing the foregoing queuing architectures and methods could be less expensive than alternative implementations, which might not prioritize correctly under severe congestion as projected for many MANET situations.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A node for use in a mobile ad-hoc network, the node comprising a processor, memory, a plurality of output queues, and an output priority scheduler, the node configured to:
   classify a plurality of packets (a) in accordance with a first set of priority levels based on urgency and (b) within each priority level of the first set, in accordance with a second set of priority levels based on importance;
   queue packets classified at highest priority levels of the first and/or second sets in a plurality of high-priority output queues;
   queue packets classified at medium priority levels of the first set in one or more medium-priority output queues;
   queue packets classified at low priority levels of the first and/or second set in one or more low-priority output queues; and
   using the output priority scheduler, serve the packets in order of the priorities of the output queues.

2. The node of claim 1, comprising a plurality of medium-priority output queues; and
   a weighted scheduler configured to schedule packets in two or more of medium-priority output queues for output by the output priority scheduler.

3. The node of claim 2, wherein packets queued in the medium-priority output queues are prioritized by the second set of priority levels within the first set of priority levels.

4. The node of claim 2, wherein packets queued in the medium-priority output queues are given different drop probabilities configured to balance drop probability generally in accordance with the first set of priority levels.

5. The node of claim 1, wherein the packets are classified based on a six-bit traffic class marker in an Internet Protocol (IP) header of each packet.

6. The node of claim 1, comprising:
   a plurality of high-priority output queues;
   a weighted scheduler configured to schedule packets classified at a plurality of medium priority levels of the first set of priority levels; and
   a plurality of medium-priority output queues for each of the plurality of medium priority levels.

7. The node of claim 1, comprising:
   ten (10) high-priority output queues;
   a weighted scheduler configured to schedule packets classified at four (4) medium priority levels of the first set of priority levels; and
   three (3) medium-priority output queues for each of the four (4) medium priority levels.

8. The node of claim 1, wherein the first set of priority levels is defined in accordance with DiffServ and the second set is defined in accordance with Multi-Level Precedence and Preemption (MLPP).

9. The node of claim 1, wherein the output queues are configured to, based at least in part on available bandwidth at a given time, give precedence to packets for output based on importance and based on urgency.

10. A network comprising a plurality of nodes, each node having a processor, memory, a plurality of output queues, and an output priority scheduler, each node configured to:
    classify and/or filter packets (a) in accordance with a first set of priority levels based on urgency and (b) within each priority level of the first set, in accordance with a second set of priority levels based on importance;
    queue packets classified at highest priority levels of the first and/or second sets in a plurality of high-priority output queues each having a different high priority;
    queue packets classified at medium priority levels of the first set in one or more medium-priority output queues;

queue packets classified at low priority levels of the first and/or second set in one or more low-priority output queues; and using the output priority scheduler, serve the packets in order of the priorities of the output queues.

11. The network of claim 10, wherein each node is configured to classify and/or filter the packets using a six-bit traffic class marker in an Internet Protocol (IP) header of each packet.

12. The network of claim 10, at least one of the nodes comprising a plurality of medium-priority output queues, and a weighted scheduler configured to schedule packets in two or more of medium-priority output queues for output by the output priority scheduler of the at least one of the nodes.

13. The network of claim 12, wherein packets queued in the medium-priority output queues are prioritized by the second set of priority levels within the first set of priority levels.

14. The network of claim 10, at least one of the nodes comprising:

a plurality of high-priority output queues;

a weighted scheduler configured to schedule packets classified at a plurality of medium priority levels of the first set of priority levels; and a plurality of medium-priority output queues for each of the plurality of medium priority levels.

15. The network of claim 10, wherein the first set of priority levels is defined in accordance with DiffServ and the second set is defined in accordance with Multi-Level Precedence and Preemption (MLPP).

16. A method of providing a traffic management mechanism in a computer network, the method comprising:

one or more nodes of the network classifying packets (a) in accordance with a first set of priority levels based on urgency and (b) within each priority level of the first set, in accordance with a second set of priority levels based on importance;

a given node of the network queuing packets classified at highest priority levels of the first and/or second sets in a plurality of high-priority output queues of the given node, each of the high-priority output queues having a different high priority;

the given node queuing packets classified at medium priority levels of the first set in one or more medium-priority output queues;

the given node queuing packets classified at low priority levels of the first and/or second set in one or more low-priority output queues; and the given node, using an output priority scheduler, serving the packets in order of the priorities of the output queues.

17. The method of claim 16, wherein the first set of priority levels is defined in accordance with DiffServ and the second set is defined in accordance with Multi-Level Precedence and Preemption (MLPP).

18. The method of claim 16, comprising each node classifying the packets using a six-bit traffic class marker in an Internet Protocol (IP) header of each packet.

19. The method of claim 16, wherein the given node uses a weighted scheduler to schedule packets in two or more medium-priority output queues for output by the output priority scheduler of the given node.

20. The method of claim 19, wherein packets queued in the medium-priority output queues are prioritized by the second set of priority levels within the first set of priority levels.

* * * * *